United States Patent [19]
Esmay

[11] 3,815,380
[45] June 11, 1974

[54] SHAFT COUPLING APPARATUS
[75] Inventor: Edward N. Esmay, Brighton, N.Y.
[73] Assignee: Xerox Corporation, Stamford, Conn.
[22] Filed: Dec. 4, 1972
[21] Appl. No.: 312,239

[52] U.S. Cl................ 64/4, 64/6, 64/9, 64/23, 287/103, 355/8
[51] Int. Cl. ............................................ F16c 1/26
[58] Field of Search ......... 64/4, 6, 3, 10, 15 R, 9 R, 64/23; 355/8; 287/3, 103

[56] References Cited
UNITED STATES PATENTS
1,128,432   2/1915   Fetzer ................................ 64/23
2,893,222   7/1959   Albedyhl et al. .................... 64/9 R
2,912,837   11/1959  Brodbeck ............................ 64/4
3,062,095   11/1962  Rutkus, Jr. et al. ................. 355/8
3,080,185   3/1963   Walker ............................... 64/6

Primary Examiner—Samuel Scott
Assistant Examiner—Randall Heald
Attorney, Agent, or Firm—J. J. Ralabate; H. Fleischer; C. A. Green

[57] ABSTRACT

An apparatus in which a pair of shaft members are readily decoupled and coupled to one another for rotary movement in unison.

The foregoing abstract is not intended to define the invention disclosed in the specification, nor is it intended to be limiting as to the scope of the invention in any way.

4 Claims, 2 Drawing Figures

SHAFT COUPLING APPARATUS

BACKGROUND OF THE INVENTION

This invention relates generally to an electrophotographic printing machine, and more particularly concerns an apparatus adapted to couple a rotary drive shaft with a shaft journaled for rotary movement.

Heretofore, the various rotating components of the printing machine have been mounted substantially fixedly to the drive mechanism. It is readily apparent that it is highly desirable to have a printing machine wherein the various subcomponents may be easily removed therefrom without the necessity of extensive manipulations to detach driven shafts from drive shafts. For example, the rollers of the various conveyor systems utilized therein are rotatably mounted. Thus, it would be advantageous to have the foregoing component, amongst others, coupled to the main drive system in a manner facilitating the ready engagement and disengagement thereof.

Conventional couplings lack the requisite flexibility, simplicity and accuracy. For example, simple rigid couplings such as flanged face couplings, or keyless compression couplings may only be utilized when the shafts are aligned with one another. Flexible couplings are used to connect shafts which are misaligned either laterally or angularly. The Oldham or double slider coupling joins shafts having only a lateral misalignment. The fast flexible coupling connects shafts which are angularly and laterally misaligned. The foregoing couplings are relatively complex and expensive as well as being difficult to use. Another type of flexible coupling is a rubber coupling. However, rubber couplings are comparatively soft and cannot readily transmit high torque loads. Conventional universal joints are generally permanent connections and do not readily lend themselves to engaging and disengaging shafts easily from one another. Finally, fluid couplings are too expensive and complex for use in a typical electrophotographic printing machine. The preceding couplings, hereinbefore described, as well as others, are discussed in detail in Mark's Mechanical Engineer's Handbook, 6th Edition, pages 8–47 through 8–50, inclusive.

Accordingly, it is a primary object of the present invention to improve coupling arrangements utilized in machines requiring the ready engagement and disengagement of shafts from one another.

SUMMARY OF THE INVENTION

Briefly stated, and in accordance with the present invention, there is provided an apparatus for coupling a pair of shaft members journaled for rotary movement to one another.

In the preferred embodiment thereof, the apparatus includes a frame member, a receiving member, biasing means, a rod member and interlocking means. The frame member is mounted on one end portion of one of the shaft members and moves in unison therewith. Pursuant to the preferred construction, the receiving member is attached to the frame member and adapted to move relative thereto as well as in unison therewith. Biasing means are provided for resiliently urging the receiving member to a normal position where it mates with the rod member mounted substantially fixedly on one end portion of the other shaft member. Furthermore, means are provided for interlocking the rod member with the receiving member so that the pair of shaft members are rotatably coupled to one another.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
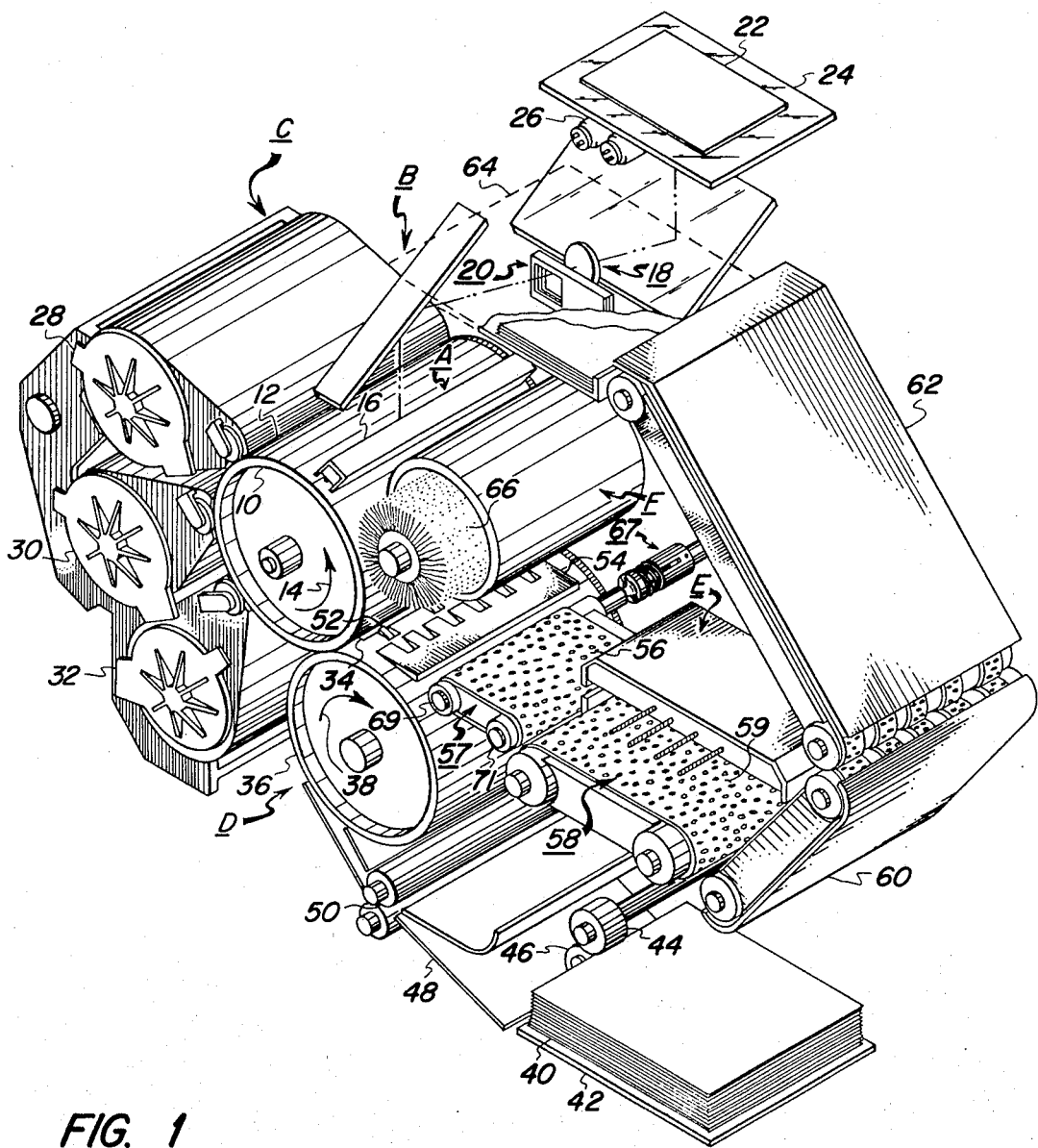
FIG. 1 is a schematic perspective view of an electrophotographic printing machine incorporating therein the coupling apparatus of the present invention.

For a general understanding of the disclosed electrophotographic printing machine in which the present invention may be incorporated, continued reference is had to the drawings wherein like reference numerals have been used throughout to designate like elements. FIG. 1 schematically illustrates the various components of a printing machine for producing multi-color copies from a colored original document. Although the coupling apparatus of the present invention is particularly well adapted for use in an electrophotographic printing machine, it will become evident from the following discussion that it is equally well suited for a wide variety of machines and is not necessarily limited in its application to the particular embodiment shown herein.

The printing machine illustrated in FIG. 1 employs a photoconductive member having a rotatably mounted drum 10 with a photoconductive surface 12 thereon. Drum 10 is mounted on a shaft (not shown) within the machine frame and is adapted to rotate in the direction of arrow 14. As drum 10 rotates in the direction of arrow 14, it passes sequentially through a series of processing stations. Drum 10 and the other machine operating mechanisms are driven at a predetermined speed relative to one another from a common drive motor (not shown). The various machine operations are coordinated to produce the proper sequence of events at the various processing stations.

Initially, drum 10 moves photoconductive surface 12 through charging station A. Charging station A has positioned thereat a corona generating device indicated generally at 16. Corona generating device 16 extends in a generally transverse direction across photoconductive surface 12. In this manner, corona generating device 16 is adapted to charge photoconductive surface 12 to a relatively high substantially uniform potential. Preferably, corona generating device 16 is of a type described in U.S. Pat. No. 2,778,946 issued to Mayo in 1957.

Thereafter, drum 10 rotates the charged photoconductive surface 12 to exposure station B. At exposure station B, a color filtered light image of the original document is projected onto charged photoconductive surface 12. Exposure station B includes a moving lens system, generally designated by the reference numeral 18, and a color filter mechanism, shown generally at 20. A suitable moving lens system is disclosed in U.S. Pat. No. 3,062,108 issued to Mayo in 1962. As shown in FIG. 1, an original document 22, such as a sheet of paper, book, or the like, is placed face down upon transparent viewing platen 24. Lamp assembly 26 and lens system 18 are moved in a timed relation with drum 10 to scan successive incremental areas of original document 22 disposed upon platen 24. This produces a flowing light image of original document 22 which is projected onto photoconductive surface 12. During exposure, filter mechanism 20 interposes selected color filters into the optical light path of lens 18. The respective color filter operates on the light rays passing through the lens to record an electrostatic latent image on photoconductive surface 12 corresponding to a preselected spectral region of the electromagnetic wave spectrum, hereinafter referred to as a single color electrostatic latent image.

The single color electrostatic latent image recorded on photoconductive surface 12, is next transported to development station C. Development station C includes thereat three individual developer units, generally indicated by the reference numerals 28, 30 and 32, respectively. A development station employing a plurality of suitable developer units is disclosed in copending application Ser. No. 255,259 filed in 1972. Preferably, the developer units are all of a type generally referred to as magnetic brush developer units. Typical magnetic brush systems utilize a magnetizable developer mix which includes carrier granules and toner particles. The developer mix is brought continually through a directional flux field to form a brush thereof. The electrostatic latent image recorded on photoconductive surface 12 is developed by bringing the brush or developer mix into contact therewith. Each of the respective developer units contain discretely colored toner particles corresponding to the complement of the spectral region of the wave length of light transmitted through filter 20, e.g. a green filtered electrostatic latent image is made visible by depositing green absorbing magenta toner particles thereon, blue and red latent images are developed with yellow and cyan toner particles, respectively.

Drum 10 is next rotated to transfer station D where the toner powder image adhering electrostatically to the latent image recorded on photoconductive surface 12 is transferred to a sheet of final support material 34. Final support material 34 may be, amongst others, plain paper. A bias transfer roll, shown generally at 36, recirculates support material 34 and is electrically biased to a potential of sufficient magnitude and polarity to attract electrostatically toner particles from the latent image recorded on photoconductive surface 12 to support material 34. A suitable electrically biased transfer roll is described in U.S. Pat. No. 3,612,677 issued to Langdon et al. in 1971. Transfer roll 36 rotates in the direction of arrow 38 in synchronism with photoconductive surface 12 (in this case at substantially the same angular velocity). Inasmuch as support material 34 is secured releasably thereon for movement in a recirculating path therewith, successive toner powder images may be transferred thereto in superimposed registration with one another. Support material 34 is fed from a stack 40 thereof disposed on sheet tray 42. Feed roll 44, in operative communication with retard roll 46, advances and separates the upper most sheet from stack 40. The advancing sheet moves into a chute 48 which directs the sheet into the nip of register rolls 50. Thereafter, gripper fingers 52 mounted on transfer roll 36 secure releasably thereon support material 34 for movement in a recirculating path therewith. With continued reference to FIG. 1, after three successive toner powder images have been transferred from photoconductive surface 12 to support material 34, gripper fingers 52 release support material 34. At this time, stripper bar 54 separates support material 34 from transfer roll 36. In this manner support material 34 is stripped from transfer roll 36 and advanced on endless belt 56 of conveyor 57 to fixing station E. The coupling apparatus, indicated generally by the reference numeral 67, is shown as being operatively connected to roller 69. Similarly, coupling apparatus 67 is connected to roller 71 (not shown). Endless belt 56 is entrained about the opposed spaced rollers 69 and 71. Coupling apparatus 67 will be described hereinafter in greater detail with reference to FIG. 2.

Referring once again to FIG. 1, a fuser, indicated generally at 58, is disposed in fixing station E, and arranged to coalesce the toner powder image to sheet 34. One type of suitable fuser is described in U.S. Pat. No. 3,498,592 issued to Moser et al, in 1970. After the fixing process, sheet 34 is advanced by endless belt conveyors 60 and 62 to catch tray 64 for subsequent removal therefrom by the machine operator.

Although a preponderance of the toner particles are transferred to support material 34, invariably some residual particles are left behind on photoconductive surface 12 after the transfer of the powder image to support material 34. The residual toner particles are removed from photoconductive surface 12 as drum 10 moves through cleaning station F. Here the residual toner particles are first brought under the influence of a suitable cleaning corona generating device (not shown) adapted to neutralize the electrostatic charge remaining on the toner particles. The neutralized toner particles are then mechanically cleaned from photoconductive surface 12 by a rotatably mounted fibrous brush 66. A suitable brush cleaning device is described in U.S. Pat. No. 3,590,412 issued to Gerbasi in 1971. Rotatably mounted brush 66 is positioned at cleaning station F and maintained in contact with photoconductive surface 12. In this manner, residua toner particles remaining on photoconucitve surface 12 after each transfer operation are removed therefrom.

It is believed that the foregoing description is sufficient for purposes of the present application to illustrate the general operation of an electrophotographic printing machine embodying the teachings of the present invention therein.

Figure 2:
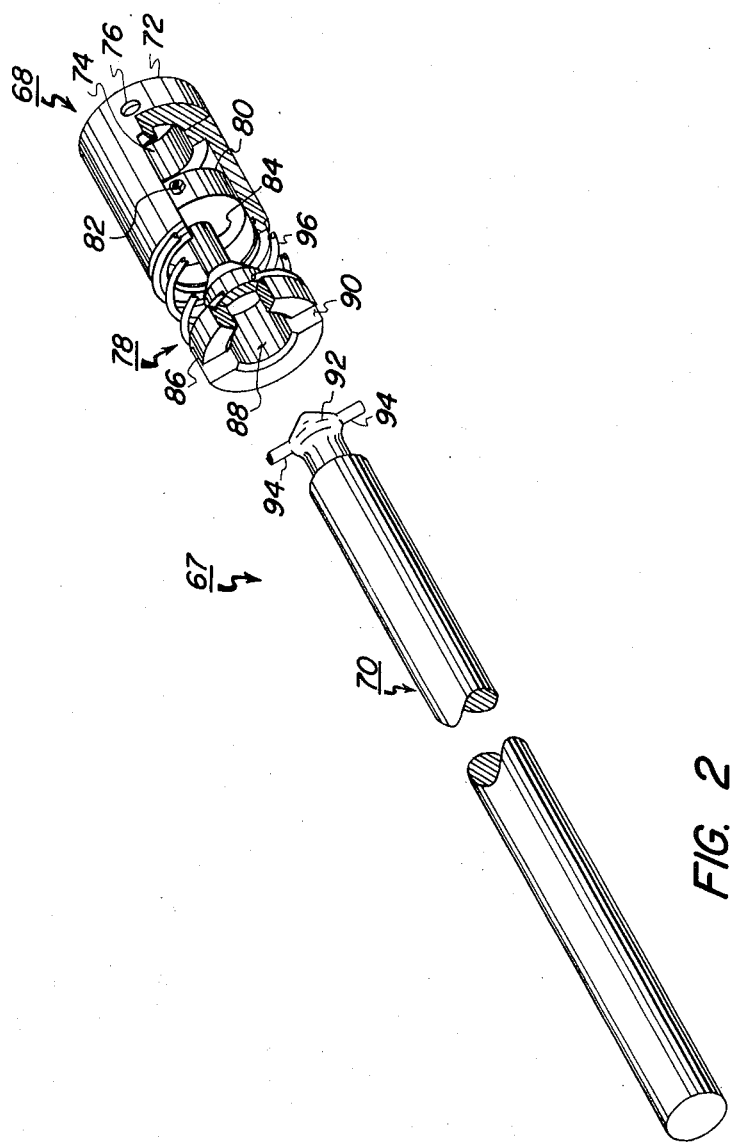
FIG. 2 is a perspective view of the coupling apparatus used in the FIG. 1 machine.

Referring now to the specific subject matter of the present invention, FIG. 2 depicts coupling apparatus 67 arranged to connect at least one rotary drive shaft of the electrophotographic printing machine illustrated in FIG. 1 with at least one shaft journaled for rotary movement therein. As shown in FIG. 1, coupling apparatus 67 connects rollers 69 and 71 with the printing machine drive mechanism. Preferably, the electrophotographic printing machine shown in FIG. 1 includes three basic drive sections, lower drives, lens drives, and upper drives. The lower drives are a removable package suspended from the vertical frame (not shown) located under conveyors 57 and 59. It is driven from the main drive shaft by a suitable timing belt. Power is fed to feed roll 46 and register rolls 50 by a pair of clutchcouplings (not shown). The lens drive comprises two substantially parallel shafts connected by a pair of gears. The lower shaft has a motor and a suitable coupling on one end thereof. A metal bellows coupling on the drive shaft rotates the transfer roll. The upper shaft has mounted thereon drum 10 and a suitable cable drive for moving lens 18. The upper drive system includes appropriate belts, shafts, and couplings located on the main vertical machine frame which drives conveyors 57, 59, 60 and 62.

The coupling apparatus depicted in FIG. 2 is preferably utilized in the foregoing conveyor systems.

As illustrated in FIG. 2, a frame member, depicted generally by the reference numeral 68, is mounted, preferably, on one or all the rotary drive shafts while a rod member, indicated generally at 70, is integral with or functions as one or all the drive shafts. Frame member 68 includes a tubular housing 72 adapted to be mounted so as to interfit telescopically over one end portion of the rotary drive shaft member. Tubular housing 72 has a pair of diametrically opposed elongated slots 74 in the circumferential surface thereof. Elongated slots 74 are arranged to be substantially parallel to the longitudinal axis of tubular housing 72. Tubular housing 72 may be mounted on the drive shaft member by being pressed thereon or mounted slidably thereon. However, if a slidable fit is utilized, a pin (not shown) passes through openings 76 in tubular housing 72 and engages the drive shaft to insure that tubular housing 72 rotates therewith. A receiving member, indicated generally by the reference numeral 78, is attached to frame member 68 to move relative thereto and in unison therewith. Receiving member 78 includes a disc member 80 mounted slidably in the bore of tubular housing 72. Disc member 80 includes a pair of diametrically opposed, outwardly extending rods 82. Rods 82 may be integral with or suitably affixed to disc member 80. In addition rods 82 are adapted to be disposed in elongated slots 74 so as to permit receiving member 78 to slide relative to frame member 68 as well as pivot about rod member 82 until disc member engages the interior surface of the bore of tubular housing 72. Disc member 80 is integral with receiving member 78 and disposed thereon at one end portion of undercut portion 84. In addition to disc member 80, receiving member 78 also includes flanged member 86 secured to the opposed end portion of undercut portion 84. Flanged member 86, preferably, includes a substantially conically recessed portion 88 therein. In addition thereto, a groove 90 extends diametrically substantially across the exterior surface 91 of flanged member 86.

Turning once again to FIG. 2, rod 70 is adapted to mate with receiving member 78 so as to rotate in unison therewith. Preferably, rod 70 includes a conical member 92 having a pair of diametrically opposed rods 94 extending substantially in an outwardly direction therefrom. Rods 94 may be integral with conical member 92 or suitably permanently affixed thereto. Conical member 92 is adapted to mate with recessed portion 88 in flanged member 86. As receiving member 68 rotates, groove 90 is aligned with rods 94 and snaps into engagement therewith, thereby driving rod 70 in unison with receiving member 68. Preferably, biasing means or coil spring 96 is mounted to interfit telescopically over receiving member 78. In particular, coil spring 96 is mounted telescopically over undercut portion 84 therein, with one end thereof in engagement with flanged member 86 at end portion 93 thereof, the other end thereof in engagement with frame member 68 at end portion 95 thereof.

Coil spring 96 is adapted to resiliently urge receiving member 78 to a normal position permitting rod 70 to mate therewith, i.e. conical member 92 is received in recessed portion 88 exerting a force thereon sliding receiving member 78 inwardly relative to frame member 68. As receiving member 78 rotates, groove 90 is aligned with rods 94 permitting spring 96 to move receiving member 78 outwardly interlocking rod 70 with receiving member 78 so that the respective shafts are coupled rotatably to one another.

Preferably rod 70, receiving member 78 and frame member 68 are made from a suitable steel, while spring 96 is made from a suitable spring steel.

In recapitulation, it is apparent that the coupling apparatus of the present invention provides a readily engageable and disengageable assembly for use in an electrophotographic printing machine. As hereinbefore described, a sub-component having at least one rotatable shaft is slid into the printing machine frame. The shaft has a portion thereof substantially the same as rod member 70 to engage receiving member 78 mounted on a rotary drive shaft connected to the printing machine drive motor. As receiving member 78 rotates, rod member 70 is interlocked therewith coupling both shafts to one another so that they rotate in unison.

While the invention has been described in connection with mounting the frame member and receiving member on the rotary drive shaft, one skilled in the art will appreciate that the invention is not necessarily so limited and that the rod member may function as or be integral with the rotary drive shaft, while the frame member and receiving member are mounted on the drive shaft.

Thus, it is apparent that there has been provided, in accordance with the present invention, a coupling apparatus that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An electrophotgraphic printing machine of the type having at least one rotary driven shaft member adapted to be coupled to at least one shaft member journaled for rotary movement, wherein the improvement includes:

a frame member mounted on one end portion of one of the shaft members for movement in unison therewith, said frame member comprising a tubular housing having one end portion thereof mounted to interfit telescopically over the end portion of the shaft member, the tubular housing having a pair of substantially diametrically opposed elongated slots in the circumferential surface and extending substantially in a direction parallel to the longitudinal axis thereof;

a receiving member attached to said frame member, said receiving member includes a disc member secured thereto in the region of one end portion therof and a pair of substantially diametrically opposed rods affixed to the disc member extending in an outwardly direction therefrom substantially normal to the longitudinal axis thereof, the disc member being mounted slidably and pivotably in the bore of the tubular member with the opposed rods extending into the corresponding slots in the tubular member of said frame member;

a rod member mounted substantially fixedly on one end portion of the other shaft member and arranged to engage said receiving member;

biasing means for resiliently urging said receiving member to a normal position relative to said frame member for enabling said rod member to mate with said receiving member; and means for interlocking said rod member with said receiving member so that the pair of shaft members are coupled rotatably to one another.

2. A printing machine as recited in claim 1, wherein:

said receiving member includes a flanged member secured thereto in the region of the other end portion thereof opposed from said disc member, said flanged member having a substantially conical recessed portion therein; and said rod member includes a conical member secured thereto in the region of one end portion thereof and adapted to mate with the recessed portion in said flanged member of said receiving member.

3. A printing machine as recited in claim 2, wherein said biasing means includes a coil spring member mounted to interfit telescopically over said receiving member intermediate one end portion of said flanged member and the end portion of said frame member opposed therefrom.

4. A printing machine as recited in claim 3, wherein said interlocking means includes a pin member affixed to said conical member extending substantially diametrically outwardly therefrom in a direction substantially normal to the longitudinal axis thereof, said flanged member having a grooved portion on the exterior surface thereof extending substantially in a direction normal to the longitudinal axis thereof and arranged to receive said pin member therein to rotatably couple the pair of shaft members to one another.

* * * * *